United States Patent
Lee

(10) Patent No.: US 12,031,057 B1
(45) Date of Patent: Jul. 9, 2024

(54) WATER-SOLUBLE PAINT OR COATING COMPOSITION HAVING ANTIBACTERIAL, DEODORIZING, AND LASTING ABILITY

(71) Applicant: Sung-Jin Lee, Seoul (KR)

(72) Inventor: Sung-Jin Lee, Seoul (KR)

( * ) Notice: Subject to any disclaimer, the term of this patent is extended or adjusted under 35 U.S.C. 154(b) by 0 days.

(21) Appl. No.: 18/558,664

(22) PCT Filed: May 19, 2022

(86) PCT No.: PCT/KR2022/007189
§ 371 (c)(1),
(2) Date: Nov. 2, 2023

(87) PCT Pub. No.: WO2022/245157
PCT Pub. Date: Nov. 24, 2022

(30) Foreign Application Priority Data

May 21, 2021 (KR) .......................... 10-2021-0065288

(51) Int. Cl.
| | |
|---|---|
| C09D 5/00 | (2006.01) |
| B01J 21/06 | (2006.01) |
| B01J 35/39 | (2024.01) |
| B01J 35/45 | (2024.01) |
| C09D 5/02 | (2006.01) |
| C09D 5/14 | (2006.01) |
| C09D 7/40 | (2018.01) |
| C09D 7/62 | (2018.01) |
| C09D 143/04 | (2006.01) |

(52) U.S. Cl.
CPC ............ *C09D 5/025* (2013.01); *B01J 21/063* (2013.01); *B01J 35/39* (2024.01); *B01J 35/45* (2024.01); *C09D 5/028* (2013.01); *C09D 5/14* (2013.01); *C09D 7/62* (2018.01); *C09D 7/67* (2018.01); *C09D 7/69* (2018.01); *C09D 143/04* (2013.01)

(58) Field of Classification Search
None
See application file for complete search history.

(56) References Cited

U.S. PATENT DOCUMENTS

2009/0318612 A1* 12/2009 Plehiers ................ C09D 5/106
524/588

FOREIGN PATENT DOCUMENTS

| | | |
|---|---|---|
| JP | 2002-212464 A | 7/2022 |
| KR | 10-2006-0117629 | 11/2006 |
| KR | 101947606 * | 1/2008 |
| KR | 10-2008-0087435 A | 10/2008 |
| KR | 10-2012-0077218 | 7/2012 |
| KR | 10-2021-0025442 A | 3/2021 |
| KR | 10-2398265 | 5/2022 |

OTHER PUBLICATIONS

KR101947606—English translation (Year: 2008).*
International Search Report and written opinion of corresponding PCT Application No. PCT/KR2022/007189 mailing on Aug. 26, 2022.
Notice of Allowance of corresponding KR Application No. 10-2021-0065288 mailing on May 9, 2022.
Office Action of corresponding KR Application No. 10-2021-0065288 mailing on Oct. 13, 2021.

* cited by examiner

*Primary Examiner* — Stefanie J Cohen
(74) *Attorney, Agent, or Firm* — IDEA Intellectual Limited; Margaret A. Burke; Sam T. Yip

(57) ABSTRACT

The present invention relates to a water-soluble paint or coating composition comprising: a zeolite-based inorganic compound in which one or more metallic ions with excellent antibacterial ability are ionically bonded; a clay mineral with excellent deodorizing ability; and a photocatalyst having lasting ability. The present invention is characterized by comprising: 1-15 wt % of metallic zeolite, which is configured by ionic bonding between metal ions and zeolite; 1-15 wt % of clay mineral; and 1-10 wt % of photocatalyst, and may exhibit, at the same time, an antibacterial effect, a deodorizing effect, and a lasting effect.

11 Claims, No Drawings

WATER-SOLUBLE PAINT OR COATING COMPOSITION HAVING ANTIBACTERIAL, DEODORIZING, AND LASTING ABILITY

TECHNICAL FIELD

The present disclosure relates to a water-soluble paint or coating composition. More specifically, the present disclosure relates to a water-soluble paint or coating composition containing a zeolite-based inorganic compound in which one or more metallic ions having excellent antibacterial ability are ionically bonded, a clay mineral having excellent deodorizing ability, and a photocatalyst having long-lasting ability.

BACKGROUND ART

Most water-soluble paints or coating agents that have been domestically developed and distributed to date only have antibacterial ability (hereinafter referred to as "antibacterial property" or "antibacterial effect") regardless of the ingredients of such paints or coating agents. Water-soluble paints or coating agents having antibacterial properties are typically referred to as antibacterial paints or coating agents. Although antibacterial paints or coating agents contain natural minerals and/or antibacterial agents of organic compounds, the antibacterial paints or coating agents containing the natural minerals and/or antibacterial agents of organic compounds have problems of having poor heat resistance and being eluted in water, thereby being dissolved. In addition, antibacterial properties are exhibited in small indoor spaces but are deteriorated in large indoor or outdoor spaces, which is problematic. To date, there have been no water-soluble paints or coating agents that exhibit both antibacterial properties and deodorizing ability (hereinafter referred to as "deodorizing property" or "deodorizing effect").

Korea Patent No. 10-1102429B1 discloses an antibacterial paint in which one or more metallic ions are subjected to ion exchange in sericite, a natural mineral. However, the antibacterial paint disclosed in the patent document has neither an excellent antibacterial effect nor a deodorizing effect, not to mention long-lasting ability (hereinafter referred to as "long-lasting properties" or "long-lasting effect").

DISCLOSURE

Technical Problem

The present disclosure aims to design a water-soluble paint or coating composition that exhibits antibacterial, deodorizing, and long-lasting effects unlike in the related art.

The present disclosure aims to design a water-soluble paint or coating composition that exhibits antibacterial, deodorizing, and long-lasting effects regardless of indoor or outdoor use.

Technical Solution

A water-soluble paint composition, according to the present disclosure, may contain 1 to 15 wt % of a metallic zeolite, 1 to 15 wt % of a clay mineral, 1 to 10 wt % of a photocatalyst, 15 to 40 wt % of an emulsion resin, 15 to 40 wt % of titanium dioxide, and 5 to 20 wt % of talc.

A water-soluble coating composition, according to the present disclosure, may contain 1 to 15 wt % of a metallic zeolite, 1 to 15 wt % of a clay mineral, 1 to 10 wt % of a photocatalyst, and 15 to 40 wt % of an emulsion resin, excluding titanium dioxide and talc from the water-soluble paint composition described above.

Preferably, the metallic zeolite has a particle size of 1 to 5 μm, the clay mineral has a particle size of 7 μm or less, and the photocatalyst has a particle size of 25 to 50 nm.

Preferably, a metal ion includes at least one selected from among a copper ion, a silver ion, a zinc ion, a platinum ion, and a chromium ion; a zeolite includes at least one selected from among mordenite, zeolite 4A, zeolite 5A, illite, chabazite, erionite, cancrinite, faujasite, stilbite, and ferrierite; the clay mineral includes at least one selected from among kaolinite, dickite, bentonite, clinoptilolite, and montmorillonite; and the photocatalyst includes at least one selected from among titanium dioxide ($TiO_2$), rutile, anatase, ZnO, $Zro_2$, and $WO_3$.

Preferably, the metallic zeolite is silver (Ag) zeolite, the clay mineral is clinoptilolite, and the photocatalyst is titanium dioxide ($TiO_2$).

Preferably, a weight ratio of the metallic zeolite, the clay mineral, and the photocatalyst is in a range of 1:1:1 to 3:2:5.

Preferably, the total amount of the metallic zeolite, the clay mineral, and the photocatalyst is in a range of 3 to 7 wt % with respect to the weight of the water-soluble paint or coating composition.

Preferably, the surface of the titanium dioxide is treated with an acrylate group-containing silane coupling agent.

Preferably, the water-soluble coating composition may further contain 1 to 10 wt % of a copolymer of the acrylate group-containing silane coupling agent and an acrylic acid monomer, 1 to 10 wt % of the acrylate group-containing silane coupling agent, and 1 to 10 wt % of an anti-wear agent.

Advantageous Effects

The present disclosure can provide a water-soluble paint or coating exhibits antibacterial, composition that deodorizing, and long-lasting effects.

The present disclosure can provide a water-soluble paint or coating composition that exhibits antibacterial, deodorizing, and long-lasting effects regardless of indoor or outdoor use.

MODE FOR INVENTION

Hereinafter, the present disclosure will be described in detail. However, the present disclosure is not limited or restricted by exemplary embodiments. The objectives and effects of the present disclosure may be naturally understood or become clearer through the following description, and the objectives and effects of the present disclosure are not limited to the following description. In addition, in the following description of the present disclosure, when it is determined that the detailed description of the known art related to the present disclosure might obscure the gist of the present disclosure, the detailed description thereof will be omitted.

A water-soluble paint composition, according to the present disclosure, may contain 1 to 15 wt % of a metallic zeolite, 1 to 15 wt % of a clay mineral, 1 to 10 wt % of a photocatalyst, 15 to 40 wt % of an emulsion resin, 15 to 40 wt % of titanium dioxide, and 5 to 20 wt % of talc.

A water-soluble coating composition, according to the present disclosure, may contain 1 to 15 wt % of a metallic zeolite, 1 to 15 wt % of a clay mineral, 1 to 10 wt % of a photocatalyst, and 15 to 40 wt % of an emulsion resin. Preferably, the water-soluble coating composition does not contain titanium dioxide and talc. Accordingly, a transparent coating agent may be prepared, and a transparent coating film may be formed.

The metallic zeolite is a zeolite-based inorganic compound in which one or more metallic ions are ionically bonded. As to be described later, metal ions, such as copper, silver, zinc, and the like, may exhibit a powerful sterilizing function through a direct bactericidal action. On the other hand, unlike the photocatalyst to be described later, the metallic zeolite may exhibit a powerful bactericidal function even in dark environments, for example, in a dark room, without absorbing energy from sunlight and the like.

Since ancient times, bronze bowls and silver spoons have been known as objects made of copper or silver. Copper and silver ions constituting bronze bowls and silver spoons may exhibit a bactericidal effect by destroying the DNA of airborne bacteria, viruses, and the like. On the other hand, while the bactericidal effect may be sufficiently exhibited regardless of indoor or outdoor use, the principle thereof is the same as that of the metallic zeolite.

The metallic zeolite may have a particle size of 1 to 5 μm and is preferably applicable to both indoor and outdoor uses. The metal ion may include at least one selected from among a copper ion, a silver ion, a zinc ion, a platinum ion, a chromium ion, and the like. A zeolite may include at least one selected from among mordenite, zeolite 4A, zeolite 5A, illite, chabazite, erionite, cancrinite, faujasite, stilbite, ferrierite, and the like.

The clay mineral may complement the deodorizing effect of the metallic zeolite. Accordingly, a water-soluble paint or coating agent that has both antibacterial and deodorizing effects indoors and outdoors may be provided. The clay mineral has excellent deodorizing effects against ammonia gas, nitrogen monoxide gas, amine-based gas, formaldehyde, and carbon monoxide. The clay minerals may have a particle size of 7 μm or less. The clay mineral may include at least one selected from among kaolinite, dickite, bentonite, clinoptilolite, montmorillonite, and the like.

The photocatalyst may absorb energy from sunlight or visible light to degrade toxic substances and viruses into water and carbon dioxide and may deodorize toxic gases. The photocatalyst may complement the long-lasting properties of the metallic zeolite and the clay mineral. In addition, the photocatalyst may enhance the antibacterial effect. The photocatalyst may have a particle size of 25 to 50 nm. The photocatalyst may include at least one selected from among titanium dioxide ($TiO_2$), rutile, anatase, ZnO, $ZrO_2$, and $WO_3$.

The weight ratio of the metallic zeolite and the weight ratio of the clay mineral is preferably in a range of 1 to 15 wt %. Both antibacterial and deodorizing effects are well exhibited within the numerical range described above. In addition, 1 to 10 wt % of the photocatalyst may be added to further improve the antibacterial properties and to allow long-lasting properties to be obtained.

The emulsion resin may increase the surface hardness of the coating film and impart adhesiveness, wear resistance, impact resistance, water resistance, and weather resistance against a substrate. The emulsion resin is preferably contained in an amount of 15 to 40 wt %. When the amount is less than 15 wt %, the adhesiveness and wear resistance are deteriorated, and when the amount exceeds 40 wt %, the dispersibility and processability are deteriorated.

As for the emulsion resin, at least one selected from among an acrylic emulsion resin, a polyurethane emulsion resin, a polyvinyl acetate emulsion resin, a silicone emulsion resin, a polyamide emulsion resin, and a polyester emulsion resin may be selected for use.

Any polymer having an acrylic group in the molecule may be used as the acrylic emulsion resin without limitation and may be prepared by polymerizing acrylic monomers or copolymerizing acrylic monomers with other monomers. The acrylic emulsion resin preferably has 20 to 60 wt % of a non-volatile phase.

The acrylic resin may be polymerized through emulsion polymerization and is preferably an anionic acrylic resin containing an anion. To polymerize the anionic acrylic resin, an anionic surfactant or anionic dispersant may be added during the emulsion polymerization of the acrylic resin or may be added after the completion of the emulsion polymerization of the acrylic resin.

As for the anionic surfactant or anionic dispersant, sulfates, sulfonates, phosphates, salts of rosin-fatty acid and naphthalenic acid, concentrated products of naphthalene sulfonic acid and low-molecular-weight formaldehyde, metal alkyl sulfates such as sodium lauryl sulfate, salts of dodecylbenzene, sulfonic acid, isopropylbenzene, sulfonic acid, and the like, salts of alkyl aryl sulfonic acids such as isopropylnaphthalene and sulfonic acid, salts of alkyl sulfosuccinic acid, such as dioctyl sulfosuccinic acid, sulfosuccinic acid, octyl sulfosuccinic acid, N-methyl-N-palmitoyl, tauric acid, oleyl isethionic acid, and the like, metal salts of alkylarylpolyethoxyethyl sulfate, such as sodium t-octylphenoxy-polyethoxyethyl sulfate, or the like may be used.

As for the acrylic monomer, methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxymethyl acrylate, 2-hydroxyethyl acrylate, hydroxypropyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxymethyl methacrylate, hydroxypropyl methacrylate, lauryl methacrylate, acrylic acid, methacrylic acid, methyl acrylic acid, ethyl acrylic acid, butyl acrylic acid, 2-ethylhexyl acrylic acid, decyl acrylic acid, methyl methacrylic acid, ethyl methacrylic acid, butyl methacrylic acid, 2-ethylhexyl methacrylic acid, decyl methacrylic acid, or the like may be used.

Titanium dioxide may improve the wear resistance and durability of water-soluble paints. The titanium dioxide is preferably contained in an amount of 15 to 40 wt %. When the amount is less than 15 wt %, the durability and wear resistance are deteriorated, and when the amount exceeds 40 wt %, the dispersibility and processability are deteriorated. In addition, the surface of the titanium dioxide may be treated with an acrylate group-containing silane coupling agent. The acrylate group introduced onto the surface of the titanium dioxide may improve the adhesiveness between the emulsion resin, thereby improving the heat insulation, water resistance, and wear resistance of water-soluble paints. As described above, the titanium dioxide is preferably not added to the water-soluble coating composition.

The acrylate group-containing silane coupling agent is preferably contained in an amount of 1 to 10 parts by weight with respect to 100 parts by weight of the titanium dioxide. The insulation properties of the water-soluble paint composition may be maximized within the numerical range described above. In addition, the surface of the titanium dioxide may be treated with a copolymer of the acrylate group-containing silane coupling agent and an acrylic acid monomer. The copolymer introduced onto the surface of the titanium dioxide may improve the adhesiveness between the emulsion resin and water, thereby improving the insulation properties and dispersibility of the water-soluble paint composition. The copolymer is preferably contained in an amount of 1 to 10 parts by weight with respect to 100 parts by weight of the titanium dioxide. The insulation properties and dispersibility of the water-soluble paint composition may be maximized within the numerical range described above.

Talc may improve the wear resistance and weather resistance of water-soluble paints. The talc is preferably contained in an amount of 5 to 20 wt %. When the amount is less than 5 wt %, the weather resistance and wear resistance are deteriorated, and when the amount exceeds 20 wt %, the dispersibility and impact resistance are deteriorated.

The water-soluble paint or coating composition of the present disclosure may further contain the copolymer of the acrylate group-containing silane coupling agent and the acrylic acid monomer to improve the insulation properties and wear resistance. The copolymer may improve the adhesiveness between components in the composition, insulation properties, wear resistance, heat resistance, and water resistance.

As for the acrylate group-containing silane coupling agent, 3-methacryloxypropylmethyldimethoxysilane, 3-methacryloxypropyltrimethoxysilane, 3-3-methacryloxypropylmethyldiethoxysilane, methacryloxypropyltriethoxysilane, 3-acryloxypropyltrimethoxysilane, methacryloxymethyltriethoxysilane, methacryloxymethyltrimethoxysilane, or the like may be used.

As for the acrylic acid monomer, acrylic acid, methacrylic acid, methyl acrylic acid, ethyl acrylic acid, butyl acrylic acid, 2-ethylhexyl acrylic acid, decyl acrylic acid, methyl methacrylic acid, ethyl methacrylic acid, butyl methacrylic acid, 2-ethylhexyl methacrylic acid, decyl methacrylic acid, or the like may be used.

The copolymer of the acrylate group-containing silane coupling agent and the acrylic acid monomer is used in an amount of 1 to 10 wt %. When the amount is less than 1 wt %, the effect based on addition is insignificant, and when the amount exceeds 10 wt %, the speed at which the coating film is dried is reduced.

The present disclosure may further include the acrylate group-containing silane coupling agent. The acrylate group-containing silane coupling agent may improve the adhesiveness between components in the composition, wear resistance, insulation properties, and water resistance. In particular, the silane coupling agent may improve adhesiveness between the emulsion resin. The type of acrylate group-containing silane coupling agent is the same as described above. The acrylate group-containing silane coupling agent is used in an amount of 1 to 10 wt %. When the amount is less than 1 wt %, the effect based on the addition is insignificant, and when the amount exceeds 10 wt %, the adhesiveness is deteriorated.

The present disclosure may further include an anti-wear agent to improve the wear resistance. As for the anti-wear agent, sorbitan fatty acid esters, as well as sorbitan monolaurate, sorbitan monopalmitate, sorbitan monostearate, sorbitan monooleate, and the like, may be used.

The anti-wear agent may include a polar part and a nonpolar part. The polar part is adsorbed onto the surface of the polymer, and the nonpolar part is composed of a long chain, thereby reducing the friction of the composition and preventing wear. The anti-wear agent may be contained in an amount of 1 to 10 wt %. When the amount is less than 1 wt %, the effect based on the addition is insignificant, and when the amount exceeds 10 wt %, the insulation properties are deteriorated.

The anti-wear agent may further contain a polyoxyethylene sorbitan fatty acid ester. A polyoxyethylene sorbitan monolaurate, a polyoxyethylene sorbitan monopalmitate, a polyoxyethylene sorbitan monostearate, a polyoxyethylene sorbitan monooleate, and the like may be used as the polyoxyethylene sorbitan fatty acid ester without limitation.

When using both the sorbitan fatty acid ester and the polyoxyethylene sorbitan fatty acid ester as the anti-wear agents, a weight ratio of the sorbitan fatty acid ester to the polyoxyethylene sorbitan fatty acid ester is preferably in a range of 60 to 80:20 to 40. When the range described above is met, the wear resistance and insulation properties of the composition may be maximized.

A product containing the water-soluble paint or coating composition, according to the present disclosure, may be a paint, coating agent, or adhesive.

The water-soluble paint or coating composition, according to the present disclosure, may be sprayed or applied onto the road surface or substrates, such as concrete, walls, building materials, wallpaper, and the like, by known methods, for example, brushing, roll coating, spray coating, impregnation, and the like. The thickness of the coating film is not particularly limited, which may be in a range of 0.1 μm to 20 mm depending on the purpose of use.

Therefore, in the present disclosure, each particle size of the metallic zeolite, the clay mineral, and the clay mineral may be problematic when manufacturing paints. Accordingly, in the present disclosure, the water-soluble paint or coating agent may be prepared using ultrafine particles, which may be maintained for a long time without causing discoloration or cracking even when being used.

A coating film formed from the water-soluble paint or coating composition, according to the present disclosure, is rapidly dried, environmentally friendly, and excellent in antibacterial properties, deodorizing properties, long-lasting properties, anti-condensation properties, wear resistance, fire resistance, adhesiveness, heat stability, impact resistance, and water resistance.

EXAMPLE

The present disclosure will be described in more detail based on the following examples. The terms used herein are merely illustrative to describe the present disclosure in more detail and to aid the understanding of those skilled in the art. In addition, the scope of the present disclosure should not be construed as limited thereto.

Unless otherwise defined, technical and scientific terms used herein represent meanings commonly understood by those skilled in the art to which the present disclosure belongs.

"LC1" below refers to a water-soluble paint or coating composition prepared by adding a metallic zeolite. Silver (Ag) zeolite in which silver (Ag), serving as the main material, was bonded was used as the metallic zeolite, and the metallic zeolite was contained in an amount of 5 wt % (hereinafter referred to as "LC1 5%") with respect to 100 wt % of the water-soluble paint or coating composition, thereby performing a test.

"LP3" below refers to a water-soluble paint or coating composition prepared by adding a metallic zeolite, a clay mineral, and a photocatalyst. Silver (Ag) zeolite was used as the metallic zeolite, clinoptilolite was used as the clay mineral, and titanium dioxide was ($TiO_2$) used as the photocatalyst. The weight ratio of the metallic zeolite, the clay mineral, and the photocatalyst was 1:1:1. In addition, the total amount of the metallic zeolite, clay mineral, and photocatalyst contained was configured to be 3 wt % (hereinafter referred to as "LP3 3 wt %") and 7 wt % (hereinafter referred to as "LP3 7 wt %") respectively, with respect to 100 wt % of the water-soluble paint or coating composition, thereby performing a test.

"LP4" below refers to a water-soluble paint or coating composition prepared by varying ratios of the metallic zeolite and the clay mineral, compared to those in the case of LP3 described above. The use of silver (Ag) zeolite as the metallic zeolite, clinoptilolite as the clay mineral, and titanium dioxide ($TiO_2$) as the photocatalyst was the same as in the case of LP3. The weight ratio of the metallic zeolite, the clay mineral, and the photocatalyst was 3:2:5. In addition, the total amount of the metallic zeolite, clay mineral, and photocatalyst contained was configured to be 3 wt % (hereinafter referred to as "LP4 3 wt %") and 7 wt % (hereinafter referred to as "LP4 7 wt %") respectively, with respect to 100 wt % of the water-soluble paint or coating composition, thereby performing a test.

Table 1 shows the results of antibacterial properties obtained by making a request to the Korea Analysis Test Researcher (antibacterial test, JIS Z 2801:2010, results obtained after 24 hours) on LC1 5 wt. Referring to Table 1, it is seen that the metallic zeolite has antibacterial properties. In addition, it is seen that a sufficient antibacterial effect is obtainable even when not involving the clay mineral having a deodorizing effect.

TABLE 1

| Bacteria to be tested | Degradation rate |
|---|---|
| Staphylococcus aureus | 99.9% |
| Escherichia coli | 99.9% |
| Pneumococcus | 99.9% |

Table 2 shows the results of an antibacterial test (antibacterial test, JIS Z 2801:2010, results obtained after 6 hours) before performing a deodorizing effect test. The composition whose average activity value is 2.0 or higher is determined as a pass. Referring to Table 2, it is seen that although a common t failed to approach the average activity value of 2.0, all LP3 3%, LP3 7%, LP4 3%, and LP4 7% exhibited excellent antibacterial properties.

TABLE 2

| Bacteria to be tested | Common | LP3 3% | LP3 7% | LP4 3% | LP4 7% |
|---|---|---|---|---|---|
| Staphylococcus aureus | 0.3 | 5.7 | 5.7 | 5.5 | 5.5 |
| Escherichia coli | 0.0 | 6.3 | 6.3 | 6.0 | 6.0 |
| Pneumococcus | 0.1 | 6.5 | 6.5 | 6.5 | 6.5 |

Table 3 shows the results (deodorizing rate) obtained by making a request to the Korea Analysis Test Researcher for a deodorizing effect test (deodorizing ability test, KS I 2218:2009, detector tube-type gas measuring instrument). Referring to Table 3, it is seen that LP3 and LP4 exhibit deodorizing effects by adding the clay mineral having excellent deodorizing effects. Considering the adsorption rates of trimethylamine and ammonia gas, it is seen that LP3 containing a small amount of metallic zeolite has the best deodorizing ability. Therefore, it is seen that LP3 3% is the water-soluble paint or coating composition with the most ideal conditions in terms of antibacterial and deodorizing effects. On the other hand, metallic zeolites are expensive, so the water-soluble paint or coating agent may be prepared at low costs when manufacturing paints.

TABLE 3

| Gas to be tested | LP3 3% | LP4 3% | LP4 7% |
|---|---|---|---|
| NH3 (ammonia) | 95% | 37% | 34 to 43% |
| HCHO (formaldehyde) | 99.9% | 99.9% | 99.9% |
| C3H9N (trimethylamine) | 90% | 0% | 4% to 8% |

Table 4 shows the results of performing a deodorizing ability test (deodorizing effect test, KS I 2218:2009, detector tube-type gas measuring instrument) using ultraviolet (UV) light, which exists only in outdoor sunlight, and visible light released from indoor LED and the like to determine an ability for both indoor and outdoor uses. The deodorizing ability test (deodorizing rate) against HCHO (formaldehyde) was performed on the LP4 3% sample. Before performing this test, to confirm the long-lasting properties of the deodorizing effect of the LP4 3% sample, the LP4 3% sample was sealed with a malodorous substance, stored for 10 days, taken out to minimize exposure to light and air, and then sent to a testing agency to perform the test. Referring to Table 4, it is seen that there is a deodorizing effect even under an indoor LED condition. In addition, the test was performed on the same sample as the LP4 3% sample in Table 3, so it is seen that the deodorizing ability continues to be exhibited.

TABLE 4

| Condition | Deodorizing rate |
|---|---|
| UV | 99.9% |
| LED | 90% |

In the present disclosure, not an antibacterial agent in the form of a simple mixture but an antibacterial agent for both indoor and outdoor uses based on a photocatalyst outdoors and a metallic zeolite indoors (i.e., a dark room) is prepared. Thus, the present disclosure is characterized by the optimized water-soluble paint or coating composition having antibacterial and antiviral properties as well as an excellent deodorizing effect and long-lasting properties.

Although the present disclosure has been described in detail above with reference to representative examples, those skilled in the art will understand that various modifications may be made to the examples described above without departing from the scope of the present disclosure. Therefore, the scope of the present disclosure should not be limited to the described examples but should be determined not only by the appended claims to be described but also by all changes or modified forms derived from the claims and the concept of equivalents.

The invention claimed is:
1. A water-soluble paint composition comprising:
  1 to 15 wt % of a metallic zeolite comprising a metal ion and a zeolite that are ionically bonded;
  1 to 15 wt % of a clay mineral;
  1 to 10 wt % of a photocatalyst,
  15 to 40 wt % of an emulsion resin,
  15 to 40 wt % of titanium dioxide, and
  5 to 20 wt % of talc,
  wherein a weight ratio of the metallic zeolite, the clay mineral, and the photocatalyst is 1:1:1, and the total amount of the metallic zeolite, the clay mineral, and the photocatalyst is in a range of 3 to 7 wt % with respect to the total weight of the water-soluble paint composition.

2. The paint composition of claim 1, wherein the metallic zeolite has a particle size of 1 to 5 μm,
the clay mineral has a particle size of 7 μm or less, and
the photocatalyst has a particle size of 25 to 50 nm.

3. The paint composition of claim 2, wherein the metal ion comprises at least one selected from among a copper ion, a silver ion, a zinc ion, a platinum ion, and a chromium ion,
the zeolite comprises at least one selected from among mordenite, zeolite 4A, zeolite 5A, illite, chabazite, erionite, cancrinite, faujasite, stilbite, and ferrierite,
the clay mineral comprises at least one selected from among kaolinite, dickite, bentonite, clinoptilolite, and montmorillonite, and
the photocatalyst comprises at least one selected from among titanium dioxide ($TiO_2$), rutile, anatase, ZnO, $ZrO_2$, and $WO_3$.

4. The paint composition of claim 2, wherein the metallic zeolite is silver (Ag) zeolite,
the clay mineral is clinoptilolite, and
the photocatalyst is titanium dioxide ($TiO_2$).

5. The paint composition of claim 4, wherein the surface of the titanium dioxide is treated with an acrylate group-containing silane coupling agent.

6. The paint composition of claim 5, further comprising 1 to 10 wt % of a copolymer of the acrylate group-containing silane coupling agent and an acrylic acid monomer, 1 to 10 wt % of the acrylate group-containing silane coupling agent, and 1 to 10 wt % of an anti-wear agent.

7. A water-soluble coating composition comprising:
1 to 15 wt % of a metallic zeolite comprising a metal ion and a zeolite that are ionically bonded;
1 to 15 wt % of a clay mineral;
1 to 10 wt % of a photocatalyst; and
15 to 40 wt % of an emulsion resin,
wherein a weight ratio of the metallic zeolite, the clay mineral, and the photocatalyst is 1:1:1, and
the total amount of the metallic zeolite, the clay mineral, and the photocatalyst is in a range of 3 to 7 wt % with respect to the total weight of the water-soluble coating composition.

8. The coating composition of claim 7, wherein the metallic zeolite has a particle size of 1 to 5 μm,
the clay mineral has a particle size of 7 μm or less, and
the photocatalyst has a particle size of 25 to 50 nm.

9. The coating composition of claim 8, wherein the metal ion comprises at least one selected from among a copper ion, a silver ion, a zinc ion, a platinum ion, and a chromium ion,
the zeolite comprises at least one selected from among mordenite, zeolite 4A, zeolite chabazite, 5A, illite, erionite, cancrinite, faujasite, stilbite, and ferrierite,
the clay mineral comprises at least one selected from among kaolinite, dickite, bentonite, clinoptilolite, and montmorillonite, and
the photocatalyst comprises at least one selected from among titanium dioxide ($TiO_2$), rutile, anatase, Zno, $Zro_2$, and $WO_3$.

10. The coating composition of claim 8, wherein the metallic zeolite is silver (Ag) zeolite,
the clay mineral is clinoptilolite, and
the photocatalyst is titanium dioxide ($TiO_2$).

11. The coating composition of claim 10, further comprising 1 to 10 wt % of a copolymer of an acrylate group-containing silane coupling agent and an acrylic acid monomer, 1 to 10 wt % of the acrylate group-containing silane coupling agent, and 1 to 10 wt % of an anti-wear agent.

* * * * *